(12) United States Patent  (10) Patent No.: US 10,565,366 B2
Huang et al.  (45) Date of Patent: Feb. 18, 2020

(54) NUMERICAL VERIFICATION CODE GENERATION METHOD AND DEVICE

(71) Applicants: Beijing Kingsoft Office Software, Inc., Beijing (CN); Zhuhai Kingsoft Office Software Co., Ltd., Zhuhai, Guangdong (CN); Guangzhou Kingsoft Mobile Technology Co., Ltd., Guangzhou, Guangdong (CN)

(72) Inventors: Chuantong Huang, Zhuhai (CN); Liyong Xiong, Zhuhai (CN); Weilin Peng, Zhuhai (CN); Ruilong Li, Zhuhai (CN)

(73) Assignees: Beijing Kingsoft Office Software, Inc., Beijing (CN); Zhuhai Kingsoft Office Software Co., Ltd., Zhuhai, Guangdong (CN); Guangzhou Kingsoft Mobile Technology Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/542,196

(22) PCT Filed: Oct. 24, 2016

(86) PCT No.: PCT/CN2016/103067
§ 371 (c)(1),
(2) Date: Jul. 7, 2017

(87) PCT Pub. No.: WO2017/071541
PCT Pub. Date: May 4, 2017

(65) Prior Publication Data
US 2018/0165446 A1 Jun. 14, 2018

(30) Foreign Application Priority Data
Oct. 28, 2015 (CN) .......................... 2015 1 0719071

(51) Int. Cl.
*H04L 29/06* (2006.01)
*G06F 21/46* (2013.01)
(Continued)

(52) U.S. Cl.
CPC .............. *G06F 21/46* (2013.01); *G06F 21/35* (2013.01); *H04L 63/0838* (2013.01); *H04L 63/0853* (2013.01); *H04W 12/00522* (2019.01)

(58) Field of Classification Search
CPC ..... G06F 21/46; G06F 21/35; H04L 63/0838; H04L 63/0853; H04W 12/00522
See application file for complete search history.

(56) References Cited

U.S. PATENT DOCUMENTS 6,549,194 B1 * 4/2003 McIntyre ............ G06F 21/6218
340/5.4
2004/0072600 A1 * 4/2004 Darling .................. A63F 13/10
463/1
(Continued)

FOREIGN PATENT DOCUMENTS

CN 1889421 A 1/2007
CN 102571356 A 7/2012
(Continued)

OTHER PUBLICATIONS

International Search Report dated Feb. 3, 2017, from International Application No. PCT/CN2016/103067, 4 pages.
(Continued)

*Primary Examiner* — Ghodrat Jamshidi
(74) *Attorney, Agent, or Firm* — Meunier Carlin & Curfman LLC

(57) ABSTRACT

Embodiments of the present application provide a method and device for generating digital verification codes. The specific implementation of the method comprises the following steps: selecting a first number of different digitals
(Continued)

from digitals 0-9 when it is needed to generate a digital verification code, wherein the first number is smaller than the number of digits of the digital verification code to be generated; generating a digital verification code including at least two identical digitals appeared consecutively by arranging and combining the first number of different digitals according to a preset rule; and outputting the generated digital verification code to a designated user terminal. By applying the embodiments of the present application, it is possible to reduce the difficulty for a user to remember the digital verification codes.

3 Claims, 1 Drawing Sheet

(51) Int. Cl.
    G06F 21/35       (2013.01)
    H04W 12/00       (2009.01)

(56) References Cited

U.S. PATENT DOCUMENTS

| | | | |
|---|---|---|---|
| 2007/0028299 A1 | 2/2007 | Albano | |
| 2008/0212771 A1 | 9/2008 | Hauser | |
| 2009/0319426 A1* | 12/2009 | Bain | G06F 21/53 705/42 |
| 2011/0202981 A1* | 8/2011 | Tamai | G06F 21/10 726/6 |
| 2013/0166913 A1* | 6/2013 | Lenon | H04L 9/3226 713/170 |
| 2013/0185778 A1* | 7/2013 | Tamai | G06F 21/36 726/6 |
| 2013/0185779 A1* | 7/2013 | Tamai | G06F 21/36 726/6 |
| 2014/0115682 A1* | 4/2014 | He | G06F 21/316 726/7 |
| 2014/0173710 A1* | 6/2014 | Meng | H04L 63/123 726/7 |
| 2015/0134526 A1* | 5/2015 | Russell | G06F 21/31 705/44 |
| 2015/0256542 A1* | 9/2015 | Alasingara Bhattachar | G06F 21/31 713/182 |
| 2015/0341333 A1* | 11/2015 | Feng | G06O 20/3276 713/168 |
| 2016/0028741 A1* | 1/2016 | Zhang | G06F 21/36 726/5 |
| 2016/0164882 A1* | 6/2016 | Chen | H04L 63/083 726/6 |
| 2016/0366127 A1* | 12/2016 | Tanoni | H04L 63/0853 |
| 2017/0199941 A1* | 7/2017 | Geng | G06F 21/42 |
| 2017/0310685 A1* | 10/2017 | Zhao | G06Q 20/40 |

FOREIGN PATENT DOCUMENTS

| | | |
|---|---|---|
| CN | 103870725 A | 6/2014 |
| CN | 103873432 A | 6/2014 |
| JP | 2007310819 A | 11/2007 |
| JP | 2014206806 A | 10/2014 |
| JP | 2015525394 A | 9/2015 |
| WO | 2010037429 A1 | 4/2010 |

OTHER PUBLICATIONS

Machine translation of Written Opinion dated Feb. 3, 2017, from International Application No. PCT/CN2016/103067, 3 pages.

* cited by examiner

NUMERICAL VERIFICATION CODE GENERATION METHOD AND DEVICE

The present application claims the priority to a Chinese Patent Application No. 201510719071.1, filed with the State Intellectual Property Office of People's Republic of China on Oct. 28, 2015 and entitled "Method and Device for Generating Digital Verification Codes", which is incorporated herein by reference in its entirety.

TECHNICAL FIELD

The present application relates to the field of verification code technology, and particularly to a method and device for generating digital verification codes.

BACKGROUND

With people's increasing attention being paid on network security, the verification code technology is developing more and more rapidly. A verification code takes a variety of forms such as a digital verification code, an alphabet verification code, a graphic verification code and a combination thereof and so on, wherein the digital verification code is a form with simple principles and broad applications. The verification code generally presents in a security verification part. For security needs to prevent brute force attacks, the verification code is often used to verify whether a user behavior is authentic.

In a mobile era, receiving a digital verification code by a short message is a very common and effective way for verifying the validity of a cell phone number or the authenticity of a user. When a user needs to fill a digital verification code in a short message into a certain application of a computer or a cell phone, the user needs to remember this digital verification code in a short time and therefore may have to check the short message for several times.

In prior arts, each bit of a digital verification code is selected randomly from the Arabic digitals 0-9 and the selected result is generated as a verification code. The generated code is typically a combination of digitals, each bit of which is different and which is out of order. However, for such a verification code, it is very difficult for the user to remember it in a short time and then enter it correctly once.

SUMMARY

Embodiments of the present application provide a method and device for generating digital verification code so as to reduce the difficulty for a user to remember the digital verification codes.

In order to achieve the above objective, embodiments of the present application disclose a method for generating digital verification codes which comprises the following steps:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

Preferably, the step of generating a digital verification code including at least two identical digitals appeared consecutively by arranging and combining the first number of different digitals according to a preset rule comprises:

generating a digital verification code by arranging the selected first number of different digitals randomly or in an order from small to large or from large to small, and inserting, after each of one or more digitals in the first number of different digitals, a same digital as that digital according to the number of digits of the digital verification code to be generated.

Preferably, when the number of digits of the digital verification code to be generated is 4, the first number is 3;

the step of generating a digital verification code including at least two identical digitals appeared consecutively by arranging and combining the first number of different digitals according to a preset rule comprises:

generating the digital verification code by arranging the selected 3 different digitals randomly or in an order from small to large or from large to small and inserting, after one of the 3 digitals, a same digital as that digital.

Preferably, when the number of digits of the digital verification code to be generated is 6, the first number is in a range of 3-5;

the step of generating a digital verification code including at least two identical digitals appeared consecutively by arranging and combining the first number of different digitals according to a preset rule comprises:

arranging the selected 3-5 different digitals randomly or in an order from small to large or from large to small, if 3 digitals are selected, inserting, after each of the 3 digitals respectively, a same digital as that digital to generate the digital verification code;

if 4 digitals are selected, inserting, after each of two of the 4 digitals respectively, a same digital as that digital to generate the digital verification code;

if 5 digitals are selected, inserting, after one of the 5 digitals, a same digital as that digital to generate the digital verification code.

Preferably, the step of outputting the generated digital verification code to a designated user terminal comprises:

sending the generated digital verification code in a short message to a mobile user terminal.

In order to achieve the above objective, an embodiment of the present application also discloses a device for generating digital verification codes which comprises a selection module, configured to select a first number of different digitals from digitals 0-9 when it is needed to generate a digital verification code, wherein the first number is smaller than the number of digits of the digital verification code to be generated;

a verification code generation module, configured to generate a digital verification code including at least two identical digitals appeared consecutively by arranging and combining the first number of different digitals according to a preset rule; and a verification code output module, configured to output the generated digital verification code to a designated user terminal.

Preferably, the verification code generation module comprises an arrangement submodule and a generation submodule;

the arrangement submodule is configured to arrange the selected first number of different digitals randomly or in an order from small to large or from large to small;

the generation submodule is configured to generate a digital verification code by inserting, after each of one or more digitals in the first number of different digitals, a same digital as that digital according to the number of digits of the digital verification code to be generated.

Preferably, the arrangement submodule is a first arrangement submodule and the generation submodule is a first generation submodule;

the first arrangement submodule is configured to arrange the selected 3 different digitals randomly or in an order from small to large or from large to small when the number of digits of the digital verification code to be generated is 4 and the first number is 3;

the first generation submodule is configured to generate the digital verification code by inserting, after one of the 3 digitals, a same digital as that digital.

Preferably, the arrangement submodule is a second arrangement submodule and the generation submodule is a second generation submodule;

the second arrangement submodule is configured to arrange the selected 3-5 different digitals randomly or in an order from small to large or from large to small when the number of digits of the digital verification code to be generated is 6, and the first number is in a range of 3-5;

the second generation submodule is configured to:

if 3 digitals are selected, insert, after each of the 3 digitals, a same digital as that digital to generate the digital verification code;

if 4 digitals are selected, insert, after each of two of the 4 digitals, a same digital as that digital to generate the digital verification code;

if 5 digitals are selected, insert, after one of the 5 digitals, a same digital as that digital to generate the digital verification code.

Preferably, the verification code output module is specifically configured to:

send the generated digital verification code in a short message to a mobile user terminal.

In order to achieve the above objective, an embodiment of the present application provides an electronic device suitable for generating a digital verification code, the electronic device comprising:

a housing, a processor, a memory, a circuit board, and a power circuit, wherein the circuit board is disposed inside a space enclosed by the housing, the processor and the memory are disposed on the circuit board; the power circuit is used for powering various circuits or devices in the electronic device; the memory is used for storing executable program codes; the processor executes the program corresponding to the executable program codes by reading the executable program codes stored in the memory so as to execute the following steps:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

In order to achieve the above objective, an embodiment of the present application provides an application program which is used for executing the method for generating digital verification codes provided by embodiments of the present application when being executed. Here, the method for generating digital verification codes comprises:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

In order to achieve the above objective, an embodiment of the present application provides a storage medium for storing executable codes, which are used for carrying out the method for generating digital verification codes provided by embodiments of the present application when being executed. Here, the method for generating digital verification codes comprises:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

It can be seen from the above technical solutions that in the embodiments of the present application, when it is needed to generate a digital verification code, a first number of different digitals are selected from the digitals 0-9, wherein the first number is smaller than a the number of digits of the digital verification code to be generated; the first number of different digitals are arranged and combined according to a preset rule to generate a digital verification code comprising at least two identical digitals appeared consecutively; the generated digital verification code is output to a designated user terminal.

That is, a certain number of different digitals selected are arranged and combined according to a preset rule in embodiments of the present application, so as to generate a digital verification code comprising at least two identical digitals appeared consecutively, thus reducing the difficulty for a user to remember the digital verification codes.

BRIEF DESCRIPTION OF THE DRAWINGS

In order to illustrate the technical solutions in embodiments of the present application or in prior arts more clearly, drawings used in the description in embodiments of the present application or in prior arts are introduced briefly below. It is obvious that the drawings described below are only for some embodiments of the present application, and a person skilled in the art may further obtain other drawings according to these drawings without doing any creative efforts.

DETAILED DESCRIPTION

The technical solutions in embodiments of the present application will be described clearly and completely below with reference to the accompanying drawings of embodiments of the present application. Obviously, the described embodiments are merely some of the embodiments of the present application, rather than all of the embodiments. All other embodiments obtained based on the embodiments of the present application by those ordinary skills in the art without doing any creative efforts fall in the protection scope defined by the present application.

Embodiments of the present application provide a method and device for generating digital verification codes. In this solution, when it is needed to generate a digital verification code, firstly a first number of different digitals are selected from the digitals 0-9, wherein the first number is smaller than a number of digits of the digital verification code to be generated. Then, the first number of different digitals are arranged and combined according to a preset rule to generate a digital verification code comprising at least two identical digitals appeared consecutively. Finally, the generated digital verification code is output to a designated user terminal.

The present application will be described in detail below by way of specific embodiments.

Figure 1:
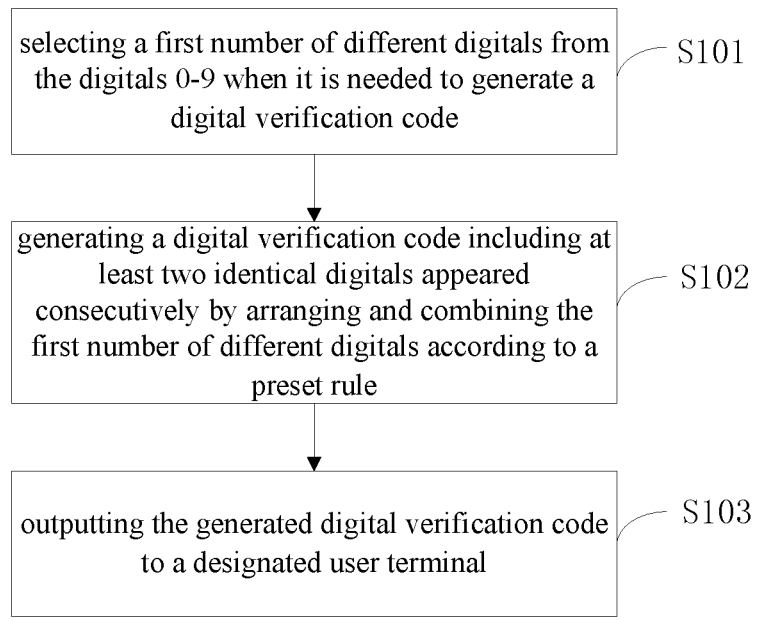
FIG. 1 is a schematic flowchart of a method for generating digital verification codes provided by an embodiment of the present application.

FIG. 1 is a schematic flowchart of the method for generating digital verification codes provided by an embodiment of the present application, the method comprising the following steps:

Step S101: selecting a first number of different digitals from the digitals 0-9 when it is needed to generate a digital verification code.

Specifically, the first number is smaller than the number of digits of the digital verification code to be generated.

Assuming that the number of digits of the digital verification code to be generated is 4 and the first number may be 3, then the different digitals selected from 0-9 may be: 012, 123, 321, 147, 915, 246, 327, 582, 359, 248, and so on.

Assuming that the number of digits of the digital verification code to be generated is 6 and the first number may be 3-5, then the different digitals selected from 0-9 may be: 321, 147, 915, 246, 1234, 2475, 4213, 1504, 12589, 04587, 45723, and so on.

Of course, in practical applications, the number of digits of the digital verification code may be other number of digits, such as 5, 7, 8 and the like. The reason for this is that common used number of bits of the digital verification code currently is 4 or 6, while other number of digits is applicable for embodiments of the present application.

Step S102: generating a digital verification code including at least two identical digitals appeared consecutively by arranging and combining the first number of different digitals according to a preset rule.

In practical applications, it is possible to generate the digital verification code by arranging the selected first number of different digitals randomly or in an order from small to large or from large to small, and inserting, after each of one or more digitals in the first number of different digitals, a same digital as that digital according to the number of digits of the digital verification code to be generated.

It is noted that the number of a plurality of digitals mentioned in embodiments of the present application is at least two.

Specifically, when the number of digits of the digital verification code to be generated is 4 and the first number is 3; the step of generating a digital verification code including at least two identical digitals appeared consecutively by arranging and combining the first number of different digitals according to a preset rule may be implemented in the following two manners.

The first one comprises:
generating the digital verification code by arranging the selected 3 different digitals randomly and inserting, after one of the 3 digitals, a same digital as that digital.

For example, part of the digitals listed in step S101 "012, 123, 321, 147, 915, 246, 327, 582, 359, 248" are arranged randomly and a same digital as that digital is inserted after one of these digitals and the generated digital verification codes are:

012→0012, 0112, 0122
123→4123, 1223, 1233
321→3321, 3221, 3211
147→4147, 1447, 1477
915→9915, 9115, 9155
246→2246, 2446, 2466
327→3327, 3227, 3277
582→5582, 5882, 5822
359→3359, 3559, 3599
248→2248, 2448, 2488

Here, left of the arrows are the initial data and right of the arrows are the digital verification codes generated finally. It can be seen that the digital verification codes generated according to the preset rule comprise two identical digitals appeared consecutively and have certain regularity, thus reducing the difficulty for a user to remember the digital verification codes.

The second one comprises:
generating the digital verification code by arranging the selected 3 different digitals in an order from small to large or from large to small and inserting, after one of the 3 digitals, a same digital as that digital.

For example, part of the digitals listed in step S101 "012, 123, 321, 147, 915, 246, 327, 582, 359, 248" are arranged in an order from small to large and a same digital as that digital is inserted after one of the 3 digitals and the generated digital verification codes are:

012→0012, 0112, 0122
123→4123, 1223, 1233
321→4123, 1223, 1233
147→4147, 1447, 1477
915→4159, 1559, 1599
246→2246, 2446, 2466
327→2337, 2237, 2377
582→2558, 2588, 2258
359→3359, 3559, 3599
248→2248, 2448, 2488

Here, left of the arrows are the initial data and right of the arrows are the digital verification codes generated finally. It can be seen that the digital verification codes generated according to the preset rule comprise two identical digitals appeared consecutively and have certain regularity, thus reducing the difficulty for a user to remember the digital verification codes.

Similarly, when the number of digits of the digital verification code to be generated is 6 and the first number is 3-5; the step of generating a digital verification code including at least two identical digitals appeared consecutively by arranging and combining the first number of different digitals according to a preset rule may also be implemented in the following two manners.

The first one comprises:
arranging the selected 3-5 different digitals randomly,
if 3 digitals are selected, inserting, after each of the 3 digitals respectively, a same digital as that digital to generate the digital verification code;
if 4 digitals are selected, inserting, after each of two of the 4 digitals respectively, a same digital as that digital to generate the digital verification code;

if 5 digitals are selected, inserting, after one of the 5 digitals, a same digital as that digital to generate the digital verification code.

For example, part of the digitals listed in step S101 "321, 147, 915, 246, 1234, 2475, 4213, 1504, 12589, 04587, 45723" are arranged randomly and a same digital as that digital is inserted after each of these digitals or each of two of or one of these digitals and the generated digital verification codes are:

321→332211
147→114477
915→991155
246→224466
1234→412234, 112334, 112344, 122334, 122344, 123344
2475→224475, 224775, 224755, 244775, 244755, 247755
4213→442213, 442113, 442133, 422113, 422133, 421133
1504→415504, 115004, 115044, 155004, 155044, 150044
12589→412589, 122589, 125589, 125889, 125899
04587→004587, 044587, 045587, 045887, 045877
45723→445723, 455723, 457723, 457223, 457233

Here, left of the arrows are the initial data and right of the arrows are the digital verification codes generated finally. It can be seen that the digital verification codes generated according to the preset rule comprise two identical digitals appeared consecutively and have certain regularity, thus reducing the difficulty for a user to remember the digital verification codes.

The second one comprises:

arranging the selected 3-5 different digitals in an order from small to large or from large to small, if 3 digitals are selected, inserting, after each of the 3 digitals respectively, a same digital as that digital to generate the digital verification code;

if 4 digitals are selected, inserting, after each of two of the 4 digitals respectively, a same digital as that digital to generate the digital verification code;

if 5 digitals are selected, inserting, after one of the 5 digitals, a same digital as that digital to generate the digital verification code.

For example, part of the digitals listed in step S101 "321, 147, 915, 246, 1234, 2475, 4213, 1504, 12589, 04587, 45723" are arranged in an order from small to large and a same digital as that digital is inserted after each of these digitals or each of two of or one of these digitals and the generated digital verification codes are:

321→112233
147→114477
915→115599
246→224466
1234→412234, 112334, 112344, 122334, 122344, 123344
2475→224457, 224577, 224557, 244577, 244557, 245577
4213→422344, 112344, 123344, 112234, 122334, 112334
1504→011455, 001145, 011445, 001455, 014455, 001445
12589→412589, 122589, 125589, 125889, 125899
04587→004578, 044578, 045578, 045788, 045778
45723→234457, 234557, 234577, 223457, 233457

Here, left of the arrows are the initial data and right of the arrows are the digital verification codes generated finally. It can be seen that the digital verification codes generated according to the preset rule comprise two identical digitals appeared consecutively and have certain regularity, thus reducing the difficulty for a user to remember the digital verification codes.

It is understood that the above embodiments are only part of the embodiments rather than all of them.

Step S103: outputting the generated digital verification code to a designated user terminal.

Specifically, the step of outputting the generated digital verification code to a designated user terminal may comprise: sending the generated digital verification code in a short message to a mobile user terminal Specific implementation is identical with that in prior arts, which is not repeated here.

It can be seen from above that in this embodiment, a certain number of different digitals selected are arranged according to a preset rule in embodiments of the present application, so as to generate a digital verification code comprising at least two identical digitals appeared consecutively, and thus the difficulty for a user to remember the digital verification code can be reduced.

Figure 2:
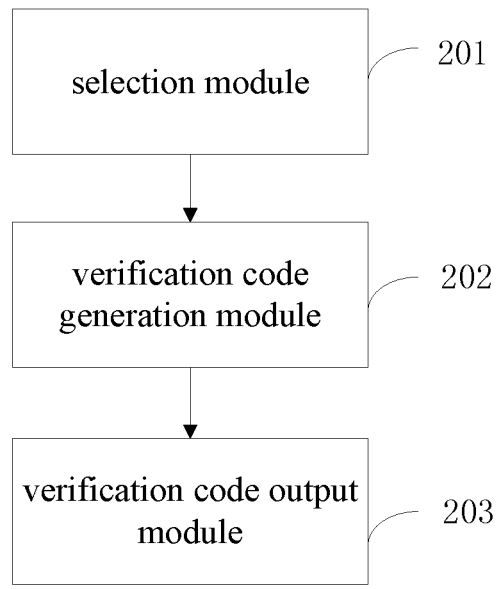
FIG. 2 is a schematic structural diagram of a device for generating digital verification codes provided by an embodiment of the present application.

FIG. 2 is a schematic structural diagram of a device for generating digital verification codes provided by the embodiments of the present application, the device comprising: a selection module 201, a verification code generation module 202, and a verification code output module 203.

Here, the selection module 201 is configured to select a first number of different digitals from digitals 0-9 when it is needed to generate a digital verification code.

Specifically, the first number is smaller than the number of digits of the digital verification code to be generated.

The verification code generation module 202 is configured to generate a digital verification code including at least two identical digitals appeared consecutively by arranging and combining the first number of different digitals according to a preset rule.

In this embodiment, the verification code generation module 202 may comprises an arrangement submodule and a generation module (not shown).

The arrangement submodule is configured to arrange the selected first number of different digitals randomly or in an order from small to large or from large to small;

the generation submodule is configured to generate a digital verification code by inserting, after each of one or more digitals in the first number of different digitals, a same digital as that digital according to the number of digits of the digital verification code to be generated.

In this embodiment, the arrangement submodule may be a first arrangement submodule and the generation submodule may be a first generation submodule (not shown).

The first arrangement submodule is configured to arrange the selected 3 different digitals randomly or in an order from small to large or from large to small when the number of digits of the digital verification code to be generated is 4 and the first number is 3;

the first generation submodule is configured to generate the digital verification code by inserting, after one of the 3 digitals, a same digital as that digital.

In this embodiment, the arrangement submodule may be a second arrangement submodule and the generation submodule may be a second generation submodule (not shown).

The second arrangement submodule is configured to arrange the selected 3-5 different digitals randomly or in an order from small to large or from large to small when the number of digits of the digital verification code to be generated is 6, and the first number is in a range of 3-5;

the second generation submodule is configured to:

if 3 digitals are selected, insert, after each of the 3 digitals, a same digital as that digital to generate the digital verification code;

if 4 digitals are selected, insert, after each of two of the 4 digitals, a same digital as that digital to generate the digital verification code;

if 5 digitals are selected, insert, after one of the 5 digitals, a same digital as that digital to generate the digital verification code.

The verification code output module 203 is configured to output the generated digital verification code to a designated user terminal.

In this embodiment, the verification code output module 203 may be configured to send the generated digital verification code in a short message to a mobile user terminal.

It can be seen from above that in this embodiment, a certain number of different digitals selected are arranged according to a preset rule in embodiments of the present application, so as to generate a digital verification code at least comprising two identical digitals appeared consecutively, and thus the difficulty for a user to remember the digital verification code can be reduced.

The embodiments of the device are described relatively briefly and reference can be made to the description of the embodiments of the method for its related contents since the embodiments of the device are substantially similar to those of the method.

An embodiment of the present application provides an electronic device suitable for generating a digital verification code, the electronic device comprising:

a housing, a processor, a memory, a circuit board, and a power circuit, wherein the circuit board is disposed inside a space enclosed by the housing, the processor and the memory are disposed on the circuit board; the power circuit is used for powering various circuits or devices in the electronic device; the memory is used for storing executable program codes; the processor executes the program corresponding to the executable program codes by reading the executable program codes stored in the memory so as to execute the following steps:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

In this embodiment, this electronic device exists in many manners, comprising but not limited to:

(1) mobile communication equipment: this kind of equipment is characterized by mobile communication capabilities, and essentially aims at providing voice, data communication. Such terminals comprise: smart phones (e.g. IPHONEs), multimedia cellphones, functional cellphones, and low-level cellphones.

(2) ultra-mobile personal computer equipment: this kind of equipment belongs to category of personal computers, which has computing and processing functions and generally possesses mobile networking property. This kind of terminals comprise PDA, MID and UMPC equipments and the like, such as IPADs.

(3) portable entertainment equipment: this kind of equipments may display and play multimedia contents. this kind of equipments comprise audio and video players (e.g. IPODs), handheld game consoles, e-books readers, as well as intelligent toys and portable on-board navigation equipments.

(4) server: an equipment providing computing services, which consists of a processor, a hard disc, a memory, a system bus and the like. The architecture of a server is similar with that of a general computer, however, due to the need to provide highly reliable services, the requirement there for in the aspects of the processing capacity, the stability, the reliability, the safety, the expandability, the manageability and the other aspects are relatively high.

(5) Other electronic devices with data interaction function.

In conclusion, in this embodiment, a certain number of different digitals selected are arranged according to a preset rule in embodiments of the present application, so as to generate a digital verification code comprising at least two identical digitals appeared consecutively, and thus the difficulty for a user to remember the digital verification code can be reduced.

In order to achieve the above objective, an embodiment of the present application provides an application program which is used for executing the method for generating digital verification codes provided by embodiments of the present application when being executed. Here, the method for generating digital verification codes comprises:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

In conclusion, in this embodiment, a certain number of different digitals selected are arranged according to a preset rule in embodiments of the present application, so as to generate a digital verification code at least comprising two identical digitals appeared consecutively, and thus the difficulty for a user to remember the digital verification code can be reduced.

An embodiment of the present application provides a storage medium for storing executable codes, which are used for executing the method for generating digital verification codes provided by embodiments of the present application when being executed. Here, the method for generating digital verification codes comprises:

selecting a first number of different digitals from digitals 0-9 when it is needed to generate a digital verification code, wherein the first number is smaller than the number of digits of the digital verification code to be generated;

generating a digital verification code including at least two identical digitals appeared consecutively by arranging and combining the first number of different digitals according to a preset rule; and outputting the generated digital verification code to a designated user terminal.

In conclusion, in this embodiment, a certain number of different digitals selected are arranged according to a preset rule in embodiments of the present application, so as to generate a digital verification code at least comprising two identical digitals appeared consecutively, and thus the difficulty for a user to remember the digital verification code can be reduced.

It is noted that the relation terms herein such as "first" and "second" or the like are only used to distinguish one entity or operation from another entity or operation, but do not necessarily require or imply that there is actual relation or order between these entities or operations. Moreover, the terms such as "include", "comprise" or any variants thereof are intended to cover a non-exclusive inclusion, such that processes, methods, objects or devices comprising a series of elements comprise not only those elements listed, but also other elements not listed specifically or the intrinsic elements comprised in these processes, methods, objects, or devices. Without more limitations, elements limited by the wording "comprise(s) a/an . . . " do not exclude that there are additional identical elements in the processes, methods, objects, or devices which comprise the listed elements.

It can be understood by those ordinary skilled in the art that all or a part of the steps in the above implementations can be carried out by relative hardware instructed by programs which may be stored in a computer readable storage medium. The storage medium here refers to ROM/RAM, a magnetic disk, an optical disk and so on.

Embodiments described above are just preferable embodiments of the present application, and not indented to limit the scope of the present application. Any modifications, alternatives, improvements or the like within the spirit and principle of the present application are included in the protection scope thereof.

The invention claimed is:

1. A computer implemented method for generating digital verification codes, wherein the method comprises:
   selecting a first number of different digitals from digitals 0-9 to generate a digital verification code, wherein the first number is smaller than the number of digits of the digital verification code to be generated, wherein when the number of digits of the digital verification code to be generated is 6, the first number is in a range of 3-5;
   generating the digital verification code including at least two identical digitals appeared consecutively by arranging and combining the first number of different digitals according to a preset rule, comprising:
      arranging the selected 3-5 different digitals randomly or in an order from small to large or from large to small, and inserting, after each of one or more digitals in the first number of different digitals, a same digital as that digital according to the number of digits of the digital verification code to be generated,
      wherein when 3 digitals are selected, inserting, after each of the 3 digitals respectively, a same digital as that digital to generate the digital verification code;
      when 4 digitals are selected, inserting, after each of two of the 4 digitals respectively, a same digital as that digital to generate the digital verification code; and
      when 5 digitals are selected, inserting, after one of the 5 digitals, a same digital as that digital to generate the digital verification code; and
   sending the generated digital verification code in a short message to a mobile user terminal of a user in order to facilitate inputting the digital verification code into the mobile user terminal by the user, and
   wherein, when the number of digits of the digital verification code to be generated is 4, the first number is 3;
   the step of generating a digital verification code including at least two identical digitals appeared consecutively by arranging and combining the first number of different digitals according to a preset rule comprises:
   generating the digital verification code by arranging the selected 3 different digitals randomly or in an order from small to large or from large to small and inserting, after one of the 3 digitals, a same digital as that digital.

2. An electronic device, wherein, the electronic device is for generating digital verification codes, the electronic device comprises:
   a housing, a processor, a memory, a circuit board, and a power circuit, wherein the circuit board is disposed inside a space enclosed by the housing, the processor and the memory are disposed on the circuit board; the power circuit is used for powering various circuits or devices in the electronic device; the memory is used for storing executable program codes; the processor executes a program corresponding to the executable program codes by reading the executable program codes stored in the memory so as to execute the following steps:
   selecting a first number of different digitals from digitals 0-9 to generate a digital verification code, wherein the first number is smaller than the number of digits of the digital verification code to be generated, wherein when the number of digits of the digital verification code to be generated is 6, the first number is in a range of 3-5;
   generating the digital verification code including at least two identical digitals appeared consecutively by arranging and combining the first number of different digitals according to a preset rule, comprising:
      arranging the selected 3-5 different digitals randomly or in an order from small to large or from large to small, and inserting, after each of one or more digitals in the first number of different digitals, a same digital as that digital according to the number of digits of the digital verification code to be generate;
      wherein when 3 digitals are selected, inserting, after each of the 3 digitals respectively, a same digital as that digital to generate the digital verification code;
      when 4 digitals are selected, inserting, after each of two of the 4 digitals respectively, a same digital as that digital to generate the digital verification code; and
      when 5 digitals are selected, inserting, after one of the 5 digitals, a same digital as that digital to generate the digital verification code; and
   sending the generated digital verification code in a short message to a mobile user terminal of a user in order to facilitate inputting the digital verification code into the mobile user terminal by the user, and
   wherein, when the number of digits of the digital verification code to be generated is 4, the first number is 3;
   the step of generating a digital verification code including at least two identical digitals appeared consecutively by arranging and combining the first number of different digitals according to a preset rule comprises:
   generating the digital verification code by arranging the selected 3 different digitals randomly or in an order from small to large or from large to small and inserting, after one of the 3 digitals, a same digital as that digital.

3. A non-temporary non-transitory storage medium, wherein the non-temporary non-transitory storage medium is used for storing executable codes, which are used for carrying out a method for generating digital verification codes when executed, the method comprising:
   selecting a first number of different digitals from digitals 0-9 to generate a digital verification code, wherein the first number is smaller than the number of digits of the digital verification code to be generated, wherein when the number of digits of the digital verification code to be generated is 6, the first number is in a range of 3-5;

generating the digital verification code including at least two identical digitals appeared consecutively by arranging and combining the first number of different digitals according to a preset rule, comprising:

arranging the selected 3-5 different digitals randomly or in an order from small to large or from large to small, and inserting, after each of one or more digitals in the first number of different digitals, a same digital as that digital according to the number of digits of the digital verification code to be generated, wherein when 3 digitals are selected, inserting, after each of the 3 digitals respectively, a same digital as that digital to generate the digital verification code;

when 4 digitals are selected, inserting, after each of two of the 4 digitals respectively, a same digital as that digital to generate the digital verification code; and when 5 digitals are selected, inserting, after one of the 5 digitals, a same digital as that digital to generate the digital verification code; and sending the generated digital verification code in a short message to a mobile user terminal of a user in order to facilitate inputting the digital verification code into the mobile user terminal by the user, and wherein, when the number of digits of the digital verification code to be generated is 4, the first number is 3;

the step of generating a digital verification code including at least two identical digitals appeared consecutively by arranging and combining the first number of different digitals according to a preset rule comprises:

generating the digital verification code by arranging the selected 3 different digitals randomly or in an order from small to large or from large to small and inserting, after one of the 3 digitals, a same digital as that digital.

\* \* \* \* \*